Nov. 27, 1956 J. J. CURRY 2,771,677

DENTAL MATRIX DEVICE

Filed March 9, 1953 4 Sheets-Sheet 1

INVENTOR.
JOHN J. CURRY
BY
Jacob Trachtman
ATTORNEY.

Nov. 27, 1956 J. J. CURRY 2,771,677

DENTAL MATRIX DEVICE

Filed March 9, 1953 4 Sheets-Sheet 2

INVENTOR.
JOHN J. CURRY
BY
Jacob Tracktman
ATTORNEY.

Nov. 27, 1956 J. J. CURRY 2,771,677

DENTAL MATRIX DEVICE

Filed March 9, 1953 4 Sheets-Sheet 3

INVENTOR.
JOHN J. CURRY
BY
Jacob Trachtman
ATTORNEY.

INVENTOR.
JOHN J. CURRY
BY
Jacob Trachtman
ATTORNEY.

United States Patent Office 2,771,677

Patented Nov. 27, 1956

2,771,677

DENTAL MATRIX DEVICE

John J. Curry, Philadelphia, Pa.

Application March 9, 1953, Serial No. 341,185

22 Claims. (Cl. 32—63)

This invention relates to a dental matrix device and more particularly to a dental matrix device provided with means for clamping a matrix band about a tooth.

It is the primary object of this invention to provide a new and improved dental matrix device which may be easily and readily applied and removed from a tooth.

Another object of the invention is to provide a new and improved dental matrix device provided with means for securely clamping a matrix band about the entire side wall circumference of a tooth.

Still another object of the invention is to provide a new and improved dental matrix device conforming more closely with the side walls of a tooth.

Yet another object of the invention is to provide a new and improved dental matrix device which is simple in construction and operation and inexpensive to construct.

A further object of the invention is to provide a new and improved dental matrix device which does not require auxiliary apparatus for clamping about a tooth.

Yet a further object of the invention is to provide a new and improved dental matrix device which is more readily applied to any tooth irrespective of its position within the mouth.

Still a further object of the invention is to provide a new and improved dental matrix device which may be conformed at its lower and upper edges to the gum and crown of the tooth respectively without interfering with its operation.

Another object of the invention is to provide a new and improved dental matrix device which may be applied to a tooth with a minimum of discomfort to a patient.

Still another object of this invention is to provide a new and improved dental matrix device which may be applied and reused a number of times before being discarded.

Yet another object of this invention is to provide a new and improved dental matrix device which is efficient in operation and rugged in construction.

The foregoing is attained as well as other objects by providing a dental matrix device comprising a flexible band member, means linking the end or terminal portions of the band member, and a slide unit engaging said means whereby the terminals of said band member are brought more closely together for clamping the band member about a tooth.

Figure 1:
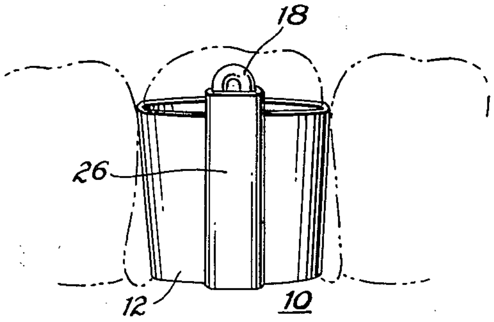
Figure 2:
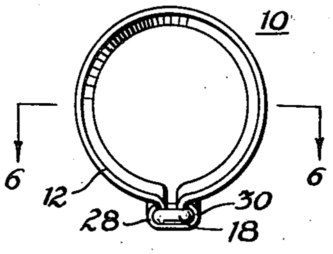
Figure 3:
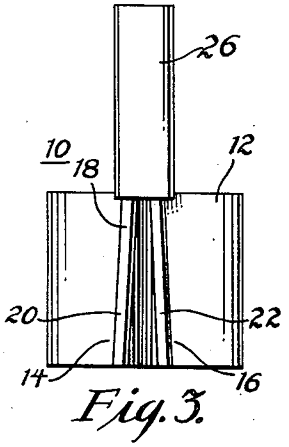
Figure 4:
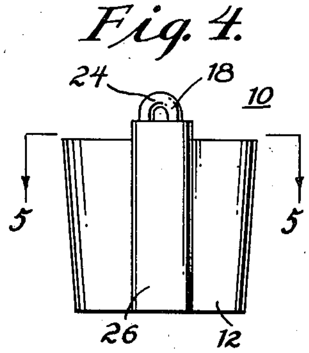
Figure 5:
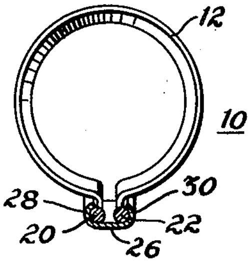
Figure 6:
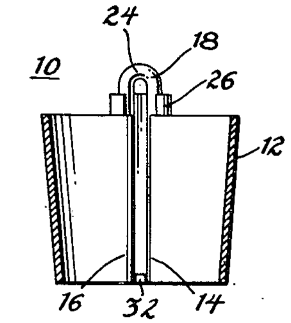
Figure 7:
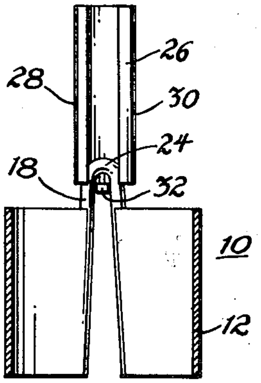
Figure 8:
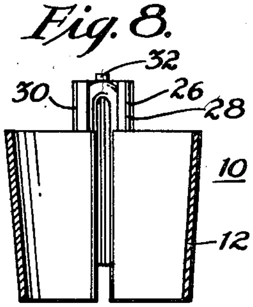
Figure 9:
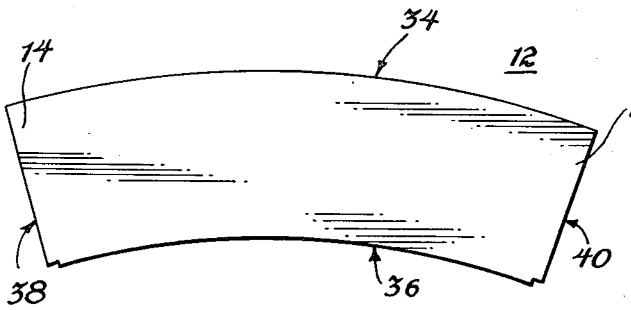
Figure 10:
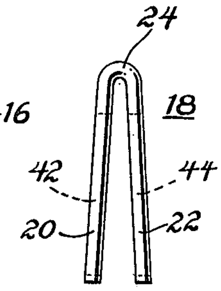
Figure 11:
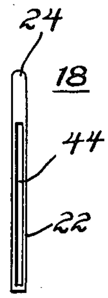
Figure 12:
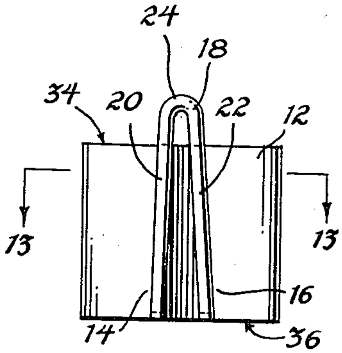
Figure 13:
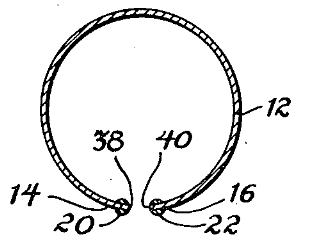
Figure 14:
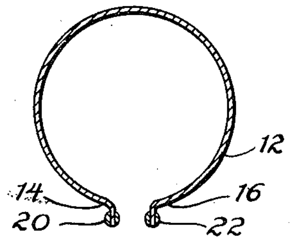
Figure 15:
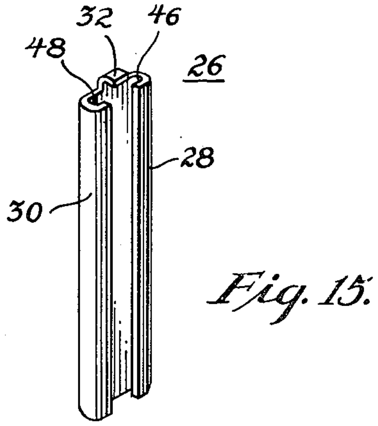
Figure 16:
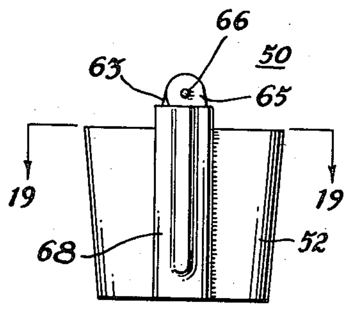
Figure 18:
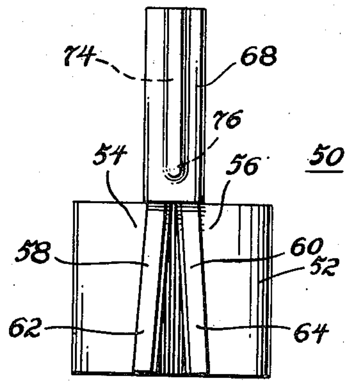
Figure 17:
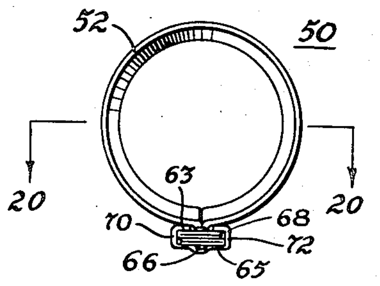
Figure 19:
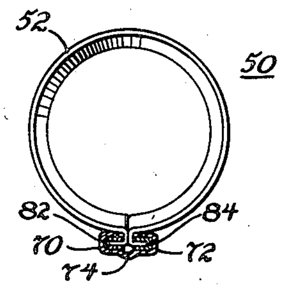
Figure 20:
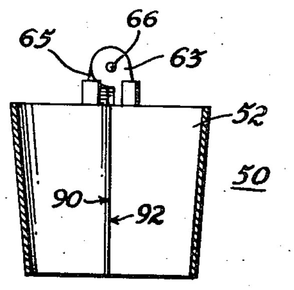
Figure 21:
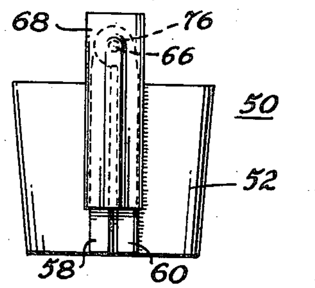
Figures 22, 25, 26, 28:
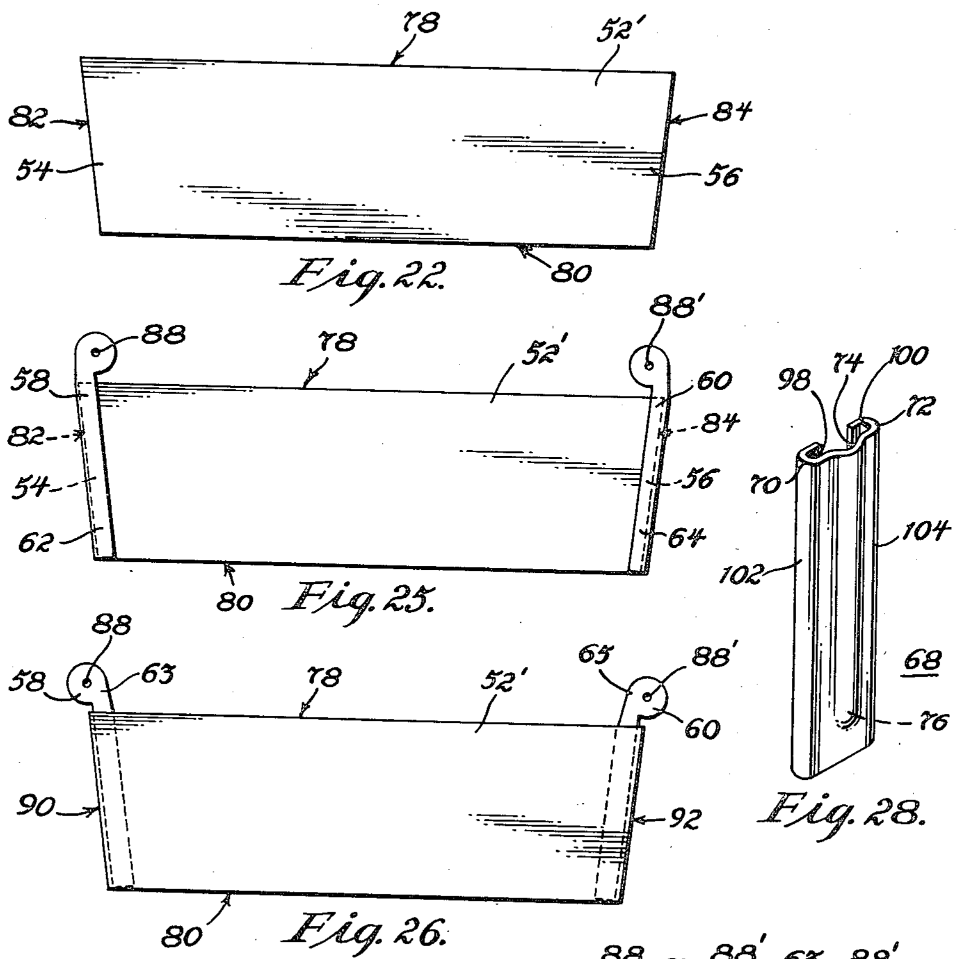
Figures 23, 24, 24A, 27:
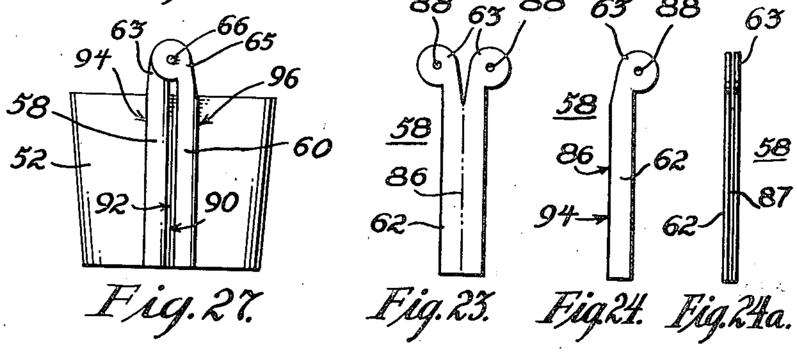

The above objects of the invention as well as many other objects will become apparent when the following description of the invention is read together with the drawings in which:

Figure 1 is a perspective view of the dental matrix device embodying the invention shown as applied to a tooth which is indicated by dashed lines, Figure 2 is a plan view of the device shown in Figure 1, Figure 3 is a front elevational view of Figure 1, showing the slide unit in its open or disengaged position, Figure 4 is a view similar to Figure 3 showing the device with the slide unit in its closed or engaged position, Figure 5 is a sectional view taken on the line 5—5 of Figure 4 showing in greater detail the slide unit and associated elements, Figure 6 is a sectional view taken on the line 6—6 of Figure 2 and rotated 180 degrees, Figure 7 is a view similar to Figure 6 showing the slide unit in an open or disengaged position, said unit being provided with an extending portion engaging the V-shaped element to limit its upward movement, Figure 8 is a view similar to that of Figure 7 showing the slide unit reversed and in its closed or engaged position so that its extended portion engages the V-shaped element to limit its downward movement, Figure 9 is a plan view of the matrix band blank formed in making the dental matrix device, Figure 10 is a front elevational view of the V-shaped element prior to assembly, Figure 11 is a side elevational view of Figure 10 clearly showing the slots in the leg portions of the V-shaped element, Figure 12 is a front elevational view of the band member with its ends or terminal portions received within respective slots of the V-shaped element, Figure 13 is a sectional view taken on the line 13—13 of Figure 12, Figure 14 is a view similar to Figure 13 with the slotted leg portion of the V-shaped element and the terminal portions of the band member bent through approximately 90 degrees, Figure 15 is an enlarged perspective view of the slide unit of the device, Figure 16 is a front elevational view of a dental matrix device of modified form embodying the invention, Figure 17 is a plan view of Figure 16, Figure 18 is a view similar to Figure 16 showing the slide unit in its open or disengaged position, Figure 19 is a view taken on line 19—19 of Figure 16 showing in detail the slide unit and associated elements, Figure 20 is a view taken on line 20—20 of Figure 17 and rotated 180 degrees, Figure 21 is a front elevational view of the device shown in Figure 16 with its slide unit reversed for limiting its downward motion, Figure 22 is a plan view of the band member blank formed in making the device, Figure 23 is a plan view of the blank formed in making the pivotal elements of said device, Figure 24 is a front elevational view of the pivotal element formed from the blank shown in Figure 23, Figure 24*a* is a side elevational view of the element shown in Figure 24, Figure 25 is a view similar to Figure 22 showing the pivotal elements received over the transverse edges and secured to the end or terminal portions of the band member, Figure 26 is a view similar to Figure 25 showing the pivotal elements and the end or terminal portions of the band member folded back on the band member, Figure 27 is a front elevational view of the device after the pivotal elements have been joined by a pivot pin, and Figure 28 is an enlarged perspective view of the slide unit of the device.

Like reference numerals designate like parts throughout the several views.

Refer to Figures 1 to 6 inclusive which show a dental matrix device 10 having a band member 12 preferably made of stainless steel material. The band member 12 is provided with terminal portions 14 and 16 forming transverse edges. A substantially V-shaped terminal connecting element 18 of resilient material has respective leg portions 20 and 22 joined by a vertex portion 24. The leg portions 20, 22 of the element 18 are secured to the terminal portions 14, 16 of the band member 12 along their respective edges by spot welding or any other suitable method.

It is noted that the resilient substantially V-shaped element 18 which connects the terminal portions 14, 16 maintains the band member 12 in a substantially cylindrical form. However, the element 18 being resilient provides a non-rigid connection and allows a limited movement of the terminal portions 14, 16 of the band member 12. This movement is sufficient to allow the band member 12 to be spread for easy application to a tooth while the element 18 tends to maintain the band member in its predetermined form.

A slide unit 26 which is received by and engages the V-shaped element 18 is an elongated body having a substantially C-shaped cross section.

The slide unit 26 may be received over the apex or vertex portion 24 to controllably confine the V-shaped member 18 within it as the unit 26 is moved towards the leg end of the element 18 (see Figures 3 and 4). The curved edge portions 28 and 30 of the slide unit 26 movably engage and confine the leg portions 20, 22 of the element 18 as the slide unit 26 is moved from its open or disengaged position to its closed or engaged position.

It is noted that as the slide unit 26 is moved towards its closed or engaged position, the leg portions 20, 22 are displaced toward each other causing the band member 12 to be clamped firmly about the tooth to which it is applied.

It is further noted that as the slide unit 26 is moved toward its closed position, the leg end of the V-shaped element 18 is increasingly displaced to a greater extent (see Figures 7 and 8) causing the band member 12 to form a section of a cone with its lower extremity forming an opening with a diameter smaller than the diameter of its upper extremity. This is an advantage since this shape conforms more closely to the side wall surface of a tooth.

Another advantage is that the action of the slide member 26 when moved downwardly on the leg portions of the V-shaped element 18 acts gradually in displacing the leg portions 20, 22 of the element 18 so that the clamping action is easily controlled.

The use of the slide unit 26 and element 18 also provides a mechanical advantage allowing great clamping pressure to be applied by the use of the smaller force necessary to move the slide unit 26 into its closed or engaged position.

The dental matrix device 10 may be easily removed from the tooth by moving the slide unit 26 towards its open or disengaged position which acts to remove the clamping tension from the band member 12.

The ease with which the dental matrix device may be applied to a tooth and then removed expedites the cutting of the lower and upper edges of the band member 12 to conform respectively to the gum and the crown portion of a tooth. This is because in such an operation the band must be removed and replaced upon the tooth a number of times to assure the proper fit.

The dental matrix device 10 does not require a separate clamping means. As already shown the matrix device, utilizing the effect of the slide unit 26 on the V-shaped element 18, provides the desired clamping action. This allows the device 10 to be more readily and easily applied to a tooth regardless of its position in the mouth while also permitting the matrix device 10 to be worn in the mouth over an extended period of time without discomfort.

It is noted that when the band member is applied to the side walls of a tooth it encompasses the tooth completely, allowing an extensive portion of the side walls of the tooth to be filled and treated.

Figure 7 shows the dental matrix device 10 with a modified slide unit 26 having an extended portion 32. The extended portion 32 engages the apex or vertex 24 of the member 18 between its leg portions 20, 22 for limiting its motion in the upward or disengaging direction. The extended portion 32 of the slide unit 26 thus prevents the removal of the unit 26 when in its open or disengaged position. Because of this the device 10 may be placed in the patient's mouth without the danger of the slide unit 26 becoming detached and allows the device to be readily clamped after it is placed over the tooth since the slide 26 is maintained in alignment with the element 18.

The slide unit 26 may be removed and disengaged from the element 18 by moving it in the direction from its open toward its closed position. The slide unit 26 may be replaced upon the element 18 by bringing together the ends of the leg portions 20, 22 of the element 18 and sliding the unit 26 towards its open position.

Figure 8 shows the device 10 with the slide unit 26 of Figure 7 after it has been reversed. The extending portion 32 of slide unit 26 now engages the convex surface of the apex or vertex portion 24 of the element 18, thereby limiting its motion in the downward or closed direction.

The slide unit 26 may be used in this reversed position in cases where it is desirable to prevent the unit from moving down beyond a given point. By reducing the length of the slide unit 26 the maximum clamping tension which may be applied in a given case may be limited to the degree desired.

In those applications where it is undesirable to have the slide unit 26 attached in the extended open position shown in Figure 7, the device 10 may be applied over the tooth without the slide unit and the slide unit may then be placed in engagement with the element 18 when clamping action is desired. Such application may be especially desired when the device is to be applied to a tooth located in a region of the mouth where there is insufficient space to receive the device 10 with the slide unit 26 attached as shown in Figure 7.

Refer now to Figures 9 to 15 inclusive for a description in greater detail of the fabrication and structure of the dental matrix device 10.

Figure 9 shows the matrix band blank 12 formed in the making of the dental matrix device 10. The band blank 12 has an arcuate upper edge 34 and an arcuate lower edge 36, while the terminal end portions 14 and 16 are provided with respective transverse edges 38 and 40. The transverse edges 38 and 40 are substantially perpendicular to the arcuate edges 34 and 36.

The V-shaped resilient element 18 shown in Figures 10 and 11 has its leg portions 20 and 22 provided with slots 42 and 44 respectively. It is noted that Figures 11 and 12 show the slots 42, 44 in a plane passing through the leg portions 20, 22 of the element 18.

Figure 12 shows the band member 12 with its terminal portions 14, 16 secured respectively to the leg portions 20, 22 of the element 18. The edges 38, 40 of the terminal portions 14, 16 are passed through the slots 42, 44 of leg portions 20, 22 as most clearly shown by Figure 13. The terminal portions 14, 16 may now be permanently secured to the leg portions 20, 22 by spot welding or any other suitable means.

Referring again to Figure 12 it may be seen that due to the attachment of the band member 12 to the V-shaped element 18, the member 12 assumes a substantially cylindrical configuration. This is due to the fact that the V-shaped element 18 maintains a greater space between the transverse edges 38, 40 at the lower arcuate edge 36 than at its upper arcuate edge 34. Thus when the edges 38, 40 are brought together by the slide unit 26 in its engaged position (Figure 8), the band member 12 assumes a substantially conical form. This is because the length of the lower arcuate edge 36 is less than that of the upper arcuate edge 34 (see Figure 9).

Figure 14 shows each terminal portion 14, 16 of the band member 12 with its associated slotted leg portion 20, 22 attached respectively bent through an angle of approximately 90 degrees. With the terminal portions 14, 16 so bent (see also Figure 5), the leg portions 20, 22 of the element 18 may be received within the respective slots 46, 48 formed by the curved portions 28, 30 of the slide unit 26 (Figure 15).

Figure 15 is an enlarged perspective view showing the slide unit 26 of the device 10 with the projecting portion 32.

The Figures 16 to 28 inclusive illustrate a dental matrix device 50 which is a modified form of the dental matrix device 10. Therefore much of the description given with regard to the device 10 may also be applied to the dental matrix device 50.

Referring now to Figures 16 to 21 inclusive, the dental matrix device 50 has a band member 52 provided with terminal portions 54 and 56 having respective transverse edges 82, 84 (Figure 19).

The transverse edges 82, 84 are folded back on the band member 52. The hinged elements 58, 60 are respectively secured along their body portions 62, 64 to the folded back portions of the band member 52.

The elements 58, 60 are also respectively provided with extending curved or offset portions 63, 65 which are pivotally connected by a pin 66. Thus the terminal portions 54, 56 of the band member 52 are pivotally connected by means of the pivotal elements 58, 60. This arrangement maintains the band member 52 in an arcuate form which may assume the substantial configuration of a conical section (Figure 16) or that of a cylinder (Figure 18).

A slide unit 68 which is received by and engages the pivotal elements 58, 60 is an elongated body having a substantially C-shaped cross section.

The slide unit 68 may be moved over the pivotal elements 58, 60 towards their non pivoted ends to controllably confine the elements 58, 60 within it.

It is noted that as the slide unit is moved from its open or disengaged position (Figure 18) towards its closed or engaged position (Figure 16) the curved edge portions 70, 72 of the slide unit 68 displace the elements 58, 60 towards each other causing the band member 52 to be clamped firmly about the tooth to which it is applied.

The elements 58, 60 are caused to pivot about the pin 66 when they are displaced relative to each other. The pivotal connection between the elements 58, 60 allows them to be readily displaced and affords greater enlargement of the band member 52 which may be desired when it is applied over a tooth.

When the slide unit 68 is in its closed or engaged position as shown in Figures 16, 20, and 21, the band member 52 is caused to assume a configuration which is substantially a conical section. The advantages inherent in this configuration which is assumed when the device is clamped about a tooth have previously been noted.

The slide unit 68 may be provided with an indention 74 extending from one end almost to its other end. The indention 74 provides a clearance for the pivot pin 66 as the slide unit 68 is moved along the elements 58, 60. The end 76 of the indention 74 provides a stop which prevents the detachment of the slide unit 68 from the device 50 when it is in its open or disengaged position.

The slide unit 68 may be detached from the device 50 by moving it along the pivotal elements 58, 60 towards their non pivoted ends.

The slide unit 68 may be replaced on the device 50 by bringing the non pivoted ends of the elements 58, 60 together and sliding it over this end.

It is noted that the extending curved portions 63, 65 of elements 58, 60 allow sufficient clearance with the unit 68 so that it does not interfere with the free pivotal action of the elements 58, 60 when the slide unit 68 is in its open or disengaged position shown in Figure 18.

Figure 21 shows the device 50 with the slide unit 68 in its closed position after it has been reversed from the position shown in Figure 16. This reversal is accomplished by removing the unit 68 and sliding it over the pivoted end of the elements 58, 60. In this case the end 76 of the indention 74 acts as a stop to limit the motion of the slide unit 68 in its downward direction towards its closed position.

The tapered form afforded by the curved extended portions 63, 65 allows the end of the slide unit 68 to be easily received thereover for engagement with the pivotal elements 58, 60.

Refer now to Figures 22 to 28 inclusive for a descripin greater detail of the fabrication and construction of the dental matrix device 50.

Figure 22 shows the band member blank 52′ having an upper edge 78 of greater length than its lower edge 80. The terminal portions 54, 56 of the band member blank 52′ are respectively provided with transverse edges 82, 84. The transverse edges 82, 84 are of equal length and converge downwardly.

Figure 25 shows the band member blank 52′ after the pivotal elements 58, 60 have been secured over the respective transverse edges 82, 84 of the blank 52′.

Figure 23 shows the blank formed in making one of the pivotal elements 58. The blank 58 of Figure 23 is folded along the line 86 providing an opening 87 into which the end portions 54, 56 may be inserted. The holes 88, 88′ are also in alignment after the blank 58 is folded.

The elements 58, 60 may be secured to the band member blank 52′ by placing the elements over the ends of the blank and applying pressure thereto and by spot welding or any other suitable method.

Figure 26 shows the band member blank 52′ after the pivotal elements 58, 60 and the respective ends of the band member blank 52′ secured therewithin have been folded back on the blank 52′.

By this operation the transverse edges 82, 84 form distal edges while proximal edges 90, 92 are formed which are of equal length and also converge in the downward direction.

The pivotal elements 58, 60 are joined together at their curved extended or offset portions 63, 65 by receiving the pin 66 through their openings 88, 88′ as illustrated by Figure 27 (see also Figure 17).

It is noted that when the edges 90, 92 are brought together (Figure 27) the device 50 assumes a form which is substantially a conical section. This conical form results because the upper edge 78 of the band member blank 52′ is of greater length than that of its lower edge 80. Figure 18 shows the device 50 in cylindrical form when the pivotal elements 58, 60 are sufficiently displaced from each other.

The distal edges 94, 96 of the pivotal elements 58, 60 (Figure 27) are received within the openings 98, 100 (Figure 28) formed by the curved portions 102, 104 of the slide unit 68 (see Figure 19).

While only a few representative embodiments of the invention disclosed herein have been outlined in detail, there will be obvious to those skilled in the art, many modifications or variations accomplishing the aforegoing objects and realizing many or all of the advantages, but which yet do not depart essentially from the spirit of the invention.

What is cleaimed is:

1. A dental matrix device comprising a flexible band member for being received about a tooth having first and second terminal portions, and a substantially V-shaped connecting element having first and second legs respectively secured lengthwise along the first and second terminal portions transversing said band member.

2. A dental matrix device comprising a flexible band member for being received about a tooth having first and second terminal portions, and a resilient substantially V-shaped element having first and second legs respectively permanently secured to and elastically coupling the first and second terminal portions of said band member.

3. A dental matrix device comprising a flexible band member for being received about a tooth having upper and lower edges and first and second terminal portions with respective edges, the upper edge of said band member having a length greater than that of its lower edge, and a resilient substantially V-shaped element having first and second leg portions secured lengthwise along respective edges of the first and second terminal portions of said band member.

4. A dental matrix device comprising a flexible band member for being received about a tooth having first and second terminal portions, a resilient substantially V-shaped element having first and second legs respectively secured lengthwise along the first and second terminal portions transversing said band member, and a unit received by said element and controllably engaging its legs for clamping said band member about said tooth.

5. A dental matrix device comprising a flexible band member for being received about a tooth having first and second terminal portions with respective edges, a resilient substantially V-shaped element having its first and second leg portions secured along respective edges of the first and second terminal portions of said band member, and a unit received by said element and movable along its legs for clamping said band member about said tooth.

6. A dental matrix device comprising a flexible band member for being received about a tooth having first and second terminal portions with respective edges, a resilient substantially V-shaped element having its first and second leg portions secured along respective edges of the first and second terminal portions of said band member, and a slide unit of substantially C-shaped cross-section engaging said element and movable along its leg portions, said slide unit displacing the leg portions of said element toward each other when moved in the leg end direction for clamping said band member about said tooth.

7. A dental matrix device comprising a flexible band member for being received about a tooth having upper and lower edges and first and second terminal portions with respective transverse edges, the upper edge of said band member having a length greater than that of its lower edge, a resilient substantially V-shaped element having its first and second leg portions secured along respective edges of the first and second terminal portions of said band members, and a slide unit of substantially C-shaped crossed-section movable along the leg portions of said element for controllably receiving and confining said element, said slide unit displacing the leg portions of said element towards each other when moved in the leg end direction for clamping said band member about said tooth.

8. A dental matrix device comprising a flexible band member for being received about a tooth having first and second terminal portions with respective edges, a resilient substantially V-shaped element having its first and second leg portions secured along respective edges of the first and second terminal portions of said band member, and an elongated slide unit of substantially C-shaped cross-section engaging and movable along the leg portions of said element for controllably receiving and confining said element, said slide unit displacing the leg portions of said element towards each other when slid in the leg end direction for clamping said band member about said tooth, said slide unit being provided with an extending portion engaging the vertex of said element to limit the motion of said slide unit.

9. A dental matrix device comprising a flexible band member for being received about a tooth having first and second terminal portions, and a pair of elongated elements each connected lengthwise along a respective one of the terminal portions transversing said band member and pivotally connected together at one of their extremities.

10. A dental matrix device comprising a flexible band member for being received about a tooth having first and second terminal portions each having a transverse edge folded back on the band member, a pair of strip elements having a body portion secured to a respective one of the transverse edges of said terminal portions and an extending portion, said pair of strips being pivotally joined at their extending portions.

11. A dental matrix device comprising a flexible band member for being received about a tooth having upper and lower edges and first and second terminal portions each having a transverse edge folded back on said band member to form proximial and distal edges, the upper edge of said band member having a length greater than that of its lower edge, a pair of strip elements having a body portion secured to a respective one of the terminal portions of said member over its distal edge and an extended offset portion, and a pin pivotally joining the extended offset portions of said strip elements.

12. A dental matrix device comprising a flexible band member for being received about a tooth having first and second terminal portions, a pair of elongated elements each connected lengthwise along a respective one of the terminal portions transversing said band member and pivotally connected together at one of their extremities, and a unit engaging the terminal portions of said band member for clamping said band member about said tooth.

13. A dental matrix device comprising a flexible band member for being received about a tooth having first and second terminal portions each having a transverse edge folded back on the band member, a pair of strip elements each having a body portion secured to a respective one of said terminal portions over its edge and an extending portion, said pair of strips being pivotally joined at their extending portions, and a unit engaging and movable along said strips for clamping said band member about said tooth.

14. A dental matrix device comprising a flexible band member for being received about a tooth having first and second terminal portions each having a transverse edge folded back on said band member to form proximal and distal edges, a pair of strip elements each having a body portion secured to a respective one of the said terminal portions over its distal edge and an extending portion, a pin pivotally joining the extended portions of said strip elements, and a slide unit provided with first and second retaining portions engaging and movable along said strip elements, said slide unit displacing said strip elements towards each other when moved along them towards their non-joined ends for clamping said band member about said tooth.

15. A dental matrix device comprising a flexible band member for being received about a tooth having upper and lower edges and first and second terminal portions each having a transverse edge folded back on said band member to form proximal and distal edges, said upper edge of said band member having a length greater than that of its lower edge, a pair of strip elements each having a body portion receiving and securing within it a respective one of the distal edges of said terminal portions and an extending offset portion, a pin pivotally joining the extended offset portions of said strip elements, and an elongated slide unit of substantially C-shaped cross-section engaging and movable along said strip elements controllably receiving and confining said elements, said slide unit displacing said elements towards each other when moved along them towards the non-pivoted ends for clamping said band member about said tooth.

16. A dental matrix device comprising a flexible band member for being received about a tooth having first and second terminal portions each having a transverse edge folded back on said band member to form proximal and distal edges, a pair of strip elements each having a body portion receiving and securing within it a respective one of the distal edges of said terminal portions and an extending offset portion, a pivot pin extending through the offset portions of said strip elements, and an elongated slide unit of substantially C-shaped cross-section engaging and movable along said strip elements controllably receiving and confining them, said slide unit being provided with an extending portion engaging said pivot pin to limit the motion of said slide unit.

17. In a dental matrix device provided with a slide unit, a band member for being received about a tooth having first and second terminal portions, and a connecting body joining the first and second terminal portions of said band member and adapted to receive a slide unit for clamping said band member about said tooth.

18. In a dental matrix device provided with a slide unit, a flexible band member for being received about a tooth having first and second terminal portions, and a substantially V-shaped connecting element having first and second legs respectively secured to the first and second terminal portions of said band member and adapted to receive a slide unit for clamping said band member about said tooth.

19. In a dental matrix device provided with a slide unit, a flexible band member for being received about a tooth having first and second terminal portions, and a resilient substantially V-shaped element having first and second legs respectively secured to the first and second terminal portions of said band member and adapted to receive a slide unit for clamping said band member about said tooth.

20. In a dental matrix device provided with a slide unit, a flexible band member for being received about a tooth having first and second terminal portions with respective edges, and a resilient substantially V-shaped element having first and second leg portions secured along respective edges of the first and second terminal portions of said band member, said element being adapted to receive a slide unit for clamping said band member about said tooth.

21. In a dental matrix device provided with a slide unit, a band member for being received about a tooth having first and second terminal portions, and a pair of elements each connected to a respective one of the terminal portions of said band member and joined together at one of their extremities, said elements being adapted to receive a slide unit for clamping said band member about said tooth.

22. In a dental matrix device provided with a slide unit, a flexible band member for being received about a tooth having first and second terminal portions, and a pair of elongated elements each connected to a repective one of the terminal portions of said band member and pivotally connected together at one of their extremities, said elements being adapted to receive a slide unit for clamping said band member about said tooth.

References Cited in the file of this patent

UNITED STATES PATENTS

| | | |
|---|---|---|
| 452,231 | Meister | May 12, 1891 |
| 474,132 | Ivory | May 3, 1892 |